Patented Jan. 19, 1943

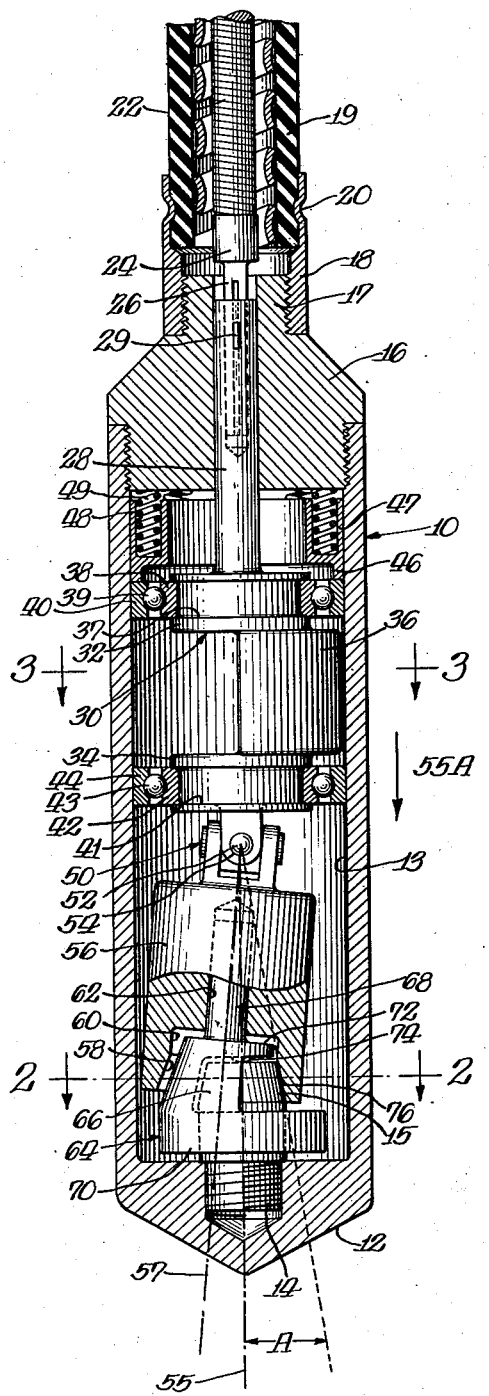

2,309,033

UNITED STATES PATENT OFFICE 2,309,033

METHOD FOR MULTIFREQUENCY VIBRATION

Robert William Baily, Narberth, Pa.

Original application February 13, 1939, Serial No. 256,249. Divided and this application April 29, 1940, Serial No. 332,273

7 Claims. (Cl. 259—1)

Among the objects of my invention is the provision of a method of treating by vibration a material such as a concrete mix by imparting to the material simultaneously a plurality of vibrations of different kinds so as to compact the mass with a lesser amount of effort and in a shorter length of time than heretofore possible.

Also an object of my invention is to provide a new and improved method for imparting to a material simultaneously a plurality of frequencies of vibration, the material being of a nature in which the particles move relatively to each other when vibrated.

Another object of my invention is to provide a new and improved method for vibrating a material simultaneously with a plurality of frequencies of vibration, the material when vibrated being of a fluid nature or becoming a flowing mass and containing in suspension particles of various mass, volume, surface tension and specific gravity, and providing as a part of the method vibrations of various frequencies, the separate frequencies being those which most favorably affect the separate particles or classes of particles which I desire to treat.

Another object of my invention is to provide a method for treating a material such as Portland cement concrete, comprising a fluid, a finely ground ingredient such as Portland cement, an ingredient such as sand having particles coarser than the cement particles, and an ingredient such as coarse aggregate having particles coarser than the sand particles, by imparting to the material a plurality of frequencies of vibration, some frequencies having a maximum advantageous effect on the fine ingredient such as the cement, other frequencies having a similar maximum advantageous effect on another ingredient such as the sand, and still other frequencies advantageously affecting the remaining ingredients such as the coarse aggregate, whereby the whole mass becomes a freely flowing material, the pluralities of frequencies of vibrations causing the ingredients to become properly intermingled, and permitting the expulsion of entrapped air and surplus fluid and causing the mass to become extremely dense and compact.

Still another object of my invention is to provide a method for treating a fluid carrying in suspension, particles of various mass, volume, surface tension and specific gravity, in which vibrations of a plurality of frequencies are imparted to the mass, some frequencies of vibration favorably affecting particles of one classification of mass, volume, surface tension or specific gravity, causing such particles to move about in the fluid and to coalesce into masses of larger volume, or of less surface tension, whereby such coalesced masses of such particles are more quickly precipitated out of the fluid, and simultaneously imparting to the fluid other frequencies of vibration which act in the same manner on other classes of particles for the same purpose.

A further object of my invention is to provide a method for expediting the chemical combination of various materials by subjecting the molecules thereof simultaneously to a variety of frequencies of vibration, whereby molecules responding to one frequency of vibration are brought into chemical contact with molecules responding to another frequency of vibration, in a manner to cause prompt chemical combination of the various molecules, with or without the presence of an assisting catalyst.

I have found in the case of a material on the order of Portland cement concrete, that the particles of the finely ground ingredient such as the cement are moved about most rapidly by vibrations of a certain frequency, and that the particles of a relatively coarser ingredient such as sand are moved about most rapidly by vibrations of a lower frequency, and that the particles of the coarsest ingredient such as gravel or crushed rock are moved about most rapidly by vibrations of a still lower frequency. I have found that by applying to the material a plurality of frequencies of vibration, selecting for each ingredient that frequency to which it best responds, the material becomes a freely flowing mass, the entrapped air and excess water are expelled, and the various ingredients are properly intermingled, in a manner much more expeditiously and efficiently than where only a single frequency of vibration is applied.

I have found that in the case of a material such as a fluid carrying particles in suspension, and where the mass, volume, surface tension or specific gravity of the particles is such that they tend to remain suspended in the fluid, and where it is desired to precipitate such particles out of the fluid in the form of sediment or to cause them to rise to the surface of the fluid, I can expedite the precipitation or separation of the particles from the fluid by imparting to the fluid a plurality of frequencies of vibration. For certain classes of particles I have selected the frequency of vibration to which those particles respond most favorably, and I have found that when so treated, the particles coalesce or gather together into groups or larger masses which more rapidly precipitate themselves from the fluid or rise to the surface as the case may be, depending on the specific type of particles; and for other classes of particles I have selected other frequencies of vibration, utilizing those frequencies most favorably affecting the particular class of particles I desire to treat; and I have found that I can simultaneously treat several classes of particles simultaneously with a plurality of frequencies of vibration and cause all of the classes of particles so treated to perform in the desired manner.

I have found that in the case of the chemical industry there are many processes in which it is desired to cause various elements or chemicals to combine rapidly. In the past, to expedite some of these chemical combinations, catalysts have been used. I have found that by imparting to the mass comprising the ingredients which it is desired to combine into chemical combinations, a variety of frequencies of vibration, the chemical combinations are greatly expedited, particularly when I select those frequencies of vibration which most favorably affect the various specific gravities of the individual elements or chemicals forming a part of the mixture. I have found that where chemical combinations utilize the action of catalysts, the action is still further expedited by the application of vibrations of suitable frequencies.

Further objects and advantages will become apparent from the following detailed description taken in connection with the accompanying drawings in which:

Figure 1 is a vertical section of one form of apparatus adapted to the practice of my method.

Figure 2 is a horizontal cross section taken on the line 2—2 of Figure 1.

Figure 3 is a horizontal cross section taken on the line 3—3 of Figure 1.

This application is a division of my co-pending application, Serial No. 256,249, filed February 13, 1939, showing an apparatus for accomplishing multiphase vibration.

In Figure 1 I show by way of example a form of apparatus capable of simultaneously generating a variety of vibrations of different kinds so designed that it may be immersed in the material to be treated. It may also be provided with devices for contact with or attachment to a container carrying the material to be treated, or may be arranged with devices whereby the vibrations may be imparted to the surface of the material to be treated.

Referring to Figure 1 there is shown a housing designated generally by the numeral 10 which may be tubular in form having a closed lower end 12 defining an inner substantially cylindrical space 13. A pin 14 is fixed centerably within the end 12 and extends vertically upward from the bottom of the cylindrical space. The pin is provided with a top 15 preferably having a frusto-conical shape.

A cap 16 is threadably engaged with the open upper end of the housing 10 and effectively closes the cylindrical space. On the upper side of the cap is a box 17 to which is secured a sleeve 18 for the purpose of attaching thereto a flexible casing 19 by means of an annular depression 20 in the upper end of the sleeve.

A flexible shaft 22 is contained within the casing and extends downwardly as shown in Figure 1 within the sleeve 18. The flexible shaft is provided at the lower end with a fitting 24 having a sliding drive spindle 26 for connection with the working parts of the vibrating device. The sliding drive spindle makes a sliding connection between the flexible shaft and a connecting shaft 28 by means of a key 29 in such a manner that the shafts are non-rotatably connected but are permitted movement in an axial direction relative to each other. The shaft 28 is joined non-rotatably to a fitting indicated generally by the character 30 consisting of an upper collar 32 and a lower collar 34 with an eccentric weight 36 forming a rigid bridge between the two collars. The upper collar is provided with a groove 37 which carries an inner race 38 of a bearing 39, whose outer race 40 is free to move axially but not rotatably over the inner surface of the cylindrical space 13. The collar 34 is likewise provided with a groove 41 which carries an inner race 42 of a bearing 43, whose outer race 44 is likewise free to move axially but not rotatably over the inner surface of the cylindrical space 13.

A ring 46 bears against the upper surface of the outer race 40 and has an upper portion 47 provided with pockets 48 each containing a pressure spring 49. The springs bear against the lower face of the cap 16 and against the outer race 40. The bearings 39 and the inner race 38 transmit the pressure from the outer race to the fitting 30.

On the underside of the collar 34 of the fitting 30 there is provided a universal joint 50 whose center of angularity 52 is at the intersection of the axis of a pin 54 with the long central axis 55 of the housing 10.

Depending from the universal joint is a weight element 56 having a substantially cylindrical outside diameter which is free to oscillate in any direction about the center of angularity, either laterally, horizontally or with an axis 57 of the weight itself traveling in a conical path about the central axis of the housing 10.

Likewise the weight will revolve about its own axis 57 at an angular rate equal to the angular rate of rotation of the connecting shaft 28 imparted to it by the flexible shaft 22.

The mounting of the lower end of the weight 56 is of a specific character having in mind the accomplishment of the method herein described. At its lower end there is a frusto-conical recess 58 and at the bottom of the recess is a somewhat cylindrical pocket 60. At the center of the pocket is an elongated aperture 62 extending along the axis 57 of the weight. The diameter of the frusto-conical recess is preferably substantially greater than the diameter of the frusto-conical end of the pin 14.

In addition there is provided a crank 64 having a portion of its upper part 66 frusto-conical in shape and having at its upper end a shank 68 adapted to be slidably received within the aperture 62 of the weight 56. The shank therefore lies in a direction concentric with the axis of the weight 56.

The lower portion of the crank consists of a ring bearing 70 which receives the cylindrical portion of the pin 14. The axis of the ring bearing is concentric with the axis 55 of the housing 10.

At the upper side a shoulder 72 is maintained out of contact with the bottom of the cylindrical pocket 60 so as not to engage the weight 56. On the upper portion of the crank also there is provided a boss 74 concentric with the axis 55 and engaging the upper end of the pin 14 at its center. With this arrangement the shank 68 may move along the axis 57 within the bore of the weight 56.

It will be seen that the face of the frusto-conical recess 58 makes an angle A with the axis 55 of the housing 10 which is likewise the axis of the pin 14 and the crank will maintain that angle not permitting it to increase or decrease. When pressure is exerted in the direction of an arrow 55A a wedging action will be created bringing the face of the recess 58 into high pressure contact with the frusto-conical face of the pin 14. Pressure in the direction of the arrow 55A is provided by the pressure of springs 49 through the fitting 30, thence through the universal joint 50 to the weight 56.

The springs 49 are made of such strength that they induce sufficient pressure at a point 76 to create a rolling contact between the weight 56 and the pin 14 and prevent a sliding contact. Therefore, as the weight 56 is rotated about its own axis 57 the face of the recess 58 must roll upon the frusto-conical face of the pin 14. During rotation the crank 64 is likewise rotated due to cooperation of its shank with the weight 56 and a space between the recess 58 and the frusto-conical portion of the crank limits rolling contact to that between the weight and the pin.

It will be seen that the eccentric weight 36 will have a certain weight of rotation and will cause the housing 10 to vibrate with a frequency of the same rate and that the weight 56 will revolve at a higher angular rate about the axis of the housing.

As a result of this there will be imparted to the housing a vibration at a corresponding rate higher than that imparted by the weight 36. The housing 10 will therefore vibrate with a plurality of frequencies of vibration different one from the other.

Further, depending upon the speed of rotation and the masses of the weights the amplitudes of the vibrations can likewise be varied.

It is further contemplated that by introduction of other weights of different masses additional frequencies and magnitudes or amplitudes of vibration may be obtained all in the same casing so that while the casing is vibrated with one dominating frequency it may at the same time be subjected to different secondary frequencies.

When a semi-fluid mass such as concrete is to be vibrated as previously noted it customarily contains a heavy aggregate such as gravel, a smaller aggregate such as sand, still smaller particles such as Portland cement, and water. The coarse aggregate or gravel may require vibration at not only a relatively small frequency but at times vibration having an amplitude or magnitude different from the vibration needed to most effectively compact the sand.

This invention contemplates subjecting such a mass to a plurality of vibrations which are adjusted both as to frequency and mass so that all of the various different component parts of a material such as concrete having different masses and specific gravities may be compacted as quickly as possible in order that the work may progress rapidly and efficiently.

While it is true that vibrations of an ordinary sort if applied to the material long enough might produce a compacted mass, nevertheless in order to prevent or minimize undesirable segregation of one class of particles from the other it is essential that the vibration may do its job quickly so that the most effective settling can be produced. Rapid vibration of this kind likewise permits the job to progress at a rapid rate which is highly desirable in present-day methods of pouring and compacting concrete.

It is also apparent that other vibratory devices having vibratory frequencies differing from those of the first apparatus may be employed simultaneously with each other or with the first apparatus, and that thereby any frequency of vibration desired or any combination of frequencies desired may be imparted to a material simultaneously.

Some changes may be made in the proportions and variations of the operation herein described without departing from the real spirit and purpose of my invention, and it is my intention to cover by my claims any modified forms of operations which may be reasonably included within their scope.

I claim as my invention:

1. A method of treating a material which is fluid when vibrated constituting a quantity of solid particles of one class having a fixed consistency and masses restricted within predetermined limits mixed with a quantity of solid particles of another class having a fixed consistency and masses restricted within predetermined limits different from the first group all amassed within a common bonding substance comprising placing said material upon a relatively stationary support impervious to said material, applying vibrations of one frequency to the material adapted to more readily coalesce the first group of particles with substantially a maximum effectiveness and simultaneously subjecting the material to vibrations of a different frequency adapted to more readily coalesce said second particles with substantially a maximum effectiveness.

2. A method of treating a material which is fluid when vibrated constituting mixing a quantity of particles of one class having masses restricted within predetermined limits with a quantity of particles of another class having masses restricted within predetermined limits different from the first group and mixing said quantities with a common bonding substance, then subjecting the material to vibrations of one magnitude adapted to coalesce the first group of particles with substantially a maximum effectiveness and simultaneously subjecting the material to vibrations of a different magnitude adapted to coalesce said second group of particles with substantially a maximum effectiveness.

3. A method of treating a material which is fluid when vibrated comprising mixing together a quantity of solid particles of one class having masses restricted within predetermined limits with a quantity of solid particles of another class having masses restricted within predetermined limits different from the first group and combining said solid particles with a common bonding substance, then confining the material in a predetermined space and subjecting the material to vibrations of one frequency and magnitude adapted to coalesce the first group of particles with substantially a maximum effectiveness and simultaneously subjecting the material to vibrations of a different frequency and magnitude adapted to coalesce said second group of particles with substantially a maximum effectiveness.

4. A method for agitating a material by imparting to the material a variety of frequencies of vibration comprising selecting solid particles having masses confined between preselected limits, mixing said particles with a bonding substance and a substantially liquid agent, confining the material within a predetermined space, making contact between the material and a source of vibrations, and producing in said source in rapid succession a plurality of frequencies of vibrations having frequencies adapted to most favorably affect respective particles of different mass, imparting said frequencies to the material thereby agitating the material and the entrained particles so that particles of one mass limitation react to vibrations at the frequency which most favorably affects them and particles of other mass limitation react to vibrations at the frequency which most favorably affects them during the same interval of time.

5. The method of treating a material consisting of selecting particles of different degrees of fineness, suspending said particles in a fluid to form the material, then imparting to the material a plurality of different frequencies of vibration simultaneously, whereby certain particles similar to each other in fineness and formerly separate from each other in the fluid are caused to coalesce with each other due to primary reaction to one suitable frequency of vibration, and simultaneously other particles of a different fineness from the first particles formerly separate from each other in the fluid are caused to coalesce with each other due to primary reaction to another suitable frequency of vibration.

6. The method of treating a material consisting of a plurality of elements or chemicals comprising creating a plurality of frequencies of vibration and concentrating said vibration at a single source, inserting said source of vibration in the material and moving the source about in the material whereby the molecules of the various elements or chemicals are caused to move about and make intimate contact in a manner to expedite the chemical combination of the various elements or chemicals one with another.

7. The method of treating a material consisting of a plurality of elements or chemicals comprising subjecting the material to the influence of a catalyst and simultaneously creating a plurality of frequencies of vibration in different directions and concentrating said vibration at a single source for maximum effectiveness at successive positions of said source, placing said source in contact with the material and moving the source to different portions of the material whereby the molecules of the various elements or chemicals are caused to vibrate and make intimate contact in a manner to expedite the chemical combination of the various elements or chemicals one with another.

ROBERT WILLIAM BAILY.